(12) United States Patent
van Neer et al.

(10) Patent No.: US 10,928,361 B2
(45) Date of Patent: Feb. 23, 2021

(54) TORSION WAVE BASED FLUID DENSITY MEASURING DEVICE AND METHOD

(71) Applicant: Nederlandse Organisatie voor toegepast-natuurwetenschappelijk onderzoek TNO, s-Gravenhage (NL)

(72) Inventors: Paul Louis Maria Joseph van Neer, 's-Gravenhage (NL); Arno Willem Frederik Volker, 's-Gravenhage (NL); Teunis Cornelis van den Dool, 's-Gravenhage (NL)

(73) Assignee: NEDERLANDSE ORGANISATIE VOOR TOEGEPAST-NATUURWETENSCHAPPELIJK ONDERZOEK TNO, 'S-Gravenhage (NL)

( * ) Notice: Subject to any disclaimer, the term of this patent is extended or adjusted under 35 U.S.C. 154(b) by 232 days.

(21) Appl. No.: 15/776,335

(22) PCT Filed: Nov. 16, 2016

(86) PCT No.: PCT/NL2016/050797
§ 371 (c)(1),
(2) Date: May 15, 2018

(87) PCT Pub. No.: WO2017/086782
PCT Pub. Date: May 26, 2017

(65) Prior Publication Data
US 2018/0299409 A1   Oct. 18, 2018

(30) Foreign Application Priority Data
Nov. 16, 2015   (EP) .................................... 15194806

(51) Int. Cl.
*G01N 29/024* (2006.01)
*G01N 29/22* (2006.01)
*G01N 9/24* (2006.01)

(52) U.S. Cl.
CPC ............. *G01N 29/024* (2013.01); *G01N 9/24* (2013.01); *G01N 29/222* (2013.01);
(Continued)

(58) Field of Classification Search
CPC .............................................. G01N 2291/0222
See application file for complete search history.

(56) References Cited

U.S. PATENT DOCUMENTS 4,193,291 A   3/1980 Lynnworth
4,596,133 A * 6/1986 Smalling ................. G01F 1/662
                                                                73/24.01
(Continued)

OTHER PUBLICATIONS

Kim, et al., "Instrument for Simultaneous Measurement of Density and Viscosity", Rev. Sci. Instrum., vol. 60, No. 6, pp. 1111-1115; 1989.

*Primary Examiner* — Daniel S Larkin
(74) *Attorney, Agent, or Firm* — Hoffmann & Baron, LLP

(57) ABSTRACT

A fluid density measuring device uses a pipe with a pipe wall that has an inner wall surface with a non-circular cross-section at least in an axial segment of the pipe. Preferably, the inner wall surface comprises one or more protrusions extending inwardly into the pipe and along the axial direction of the pipe. An ultrasound transducer located on the pipe wall is used to generate local motion of the pipe wall with a circumferential direction of motion. Preferably, the ultrasound transducer is located between successive protrusions. An ultrasound receiver located on the pipe wall receives an ultrasound torsion wave generated by the local motion after the torsion wave has traveled through the axial section wherein the inner wall surface has a non-circular cross- (Continued)

section. The fluid density is determined from the propagation speed of the torsion wave.

17 Claims, 5 Drawing Sheets

(52) U.S. Cl.
CPC .......... *G01N 2291/011* (2013.01); *G01N 2291/0222* (2013.01); *G01N 2291/02818* (2013.01); *G01N 2291/0426* (2013.01); *G01N 2291/102* (2013.01); *G01N 2291/103* (2013.01)

(56) References Cited

U.S. PATENT DOCUMENTS

| | | |
|---|---|---|
| 6,412,354 B1 | 7/2002 | Birchuak et al. |
| 2003/0230150 A1 | 12/2003 | Drahm et al. |
| 2006/0225517 A1 | 10/2006 | Rieder et al. |
| 2011/0167906 A1 | 7/2011 | Goravar et al. |
| 2013/0146388 A1 | 6/2013 | Ao et al. |

\* cited by examiner

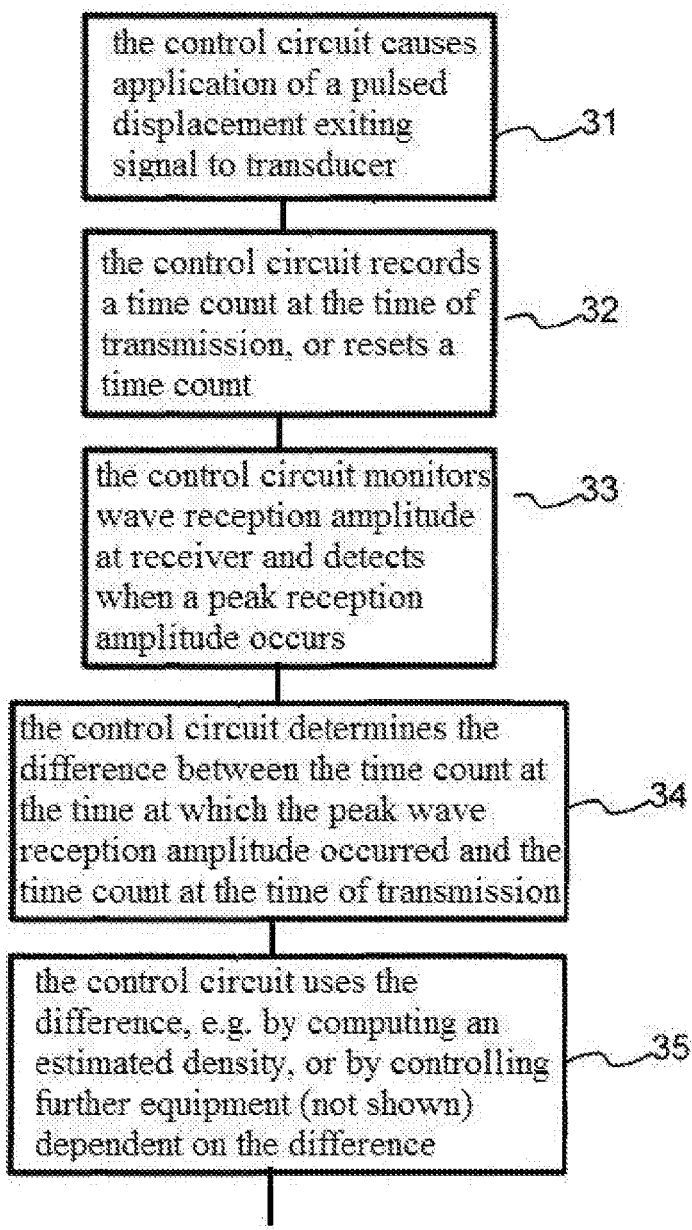

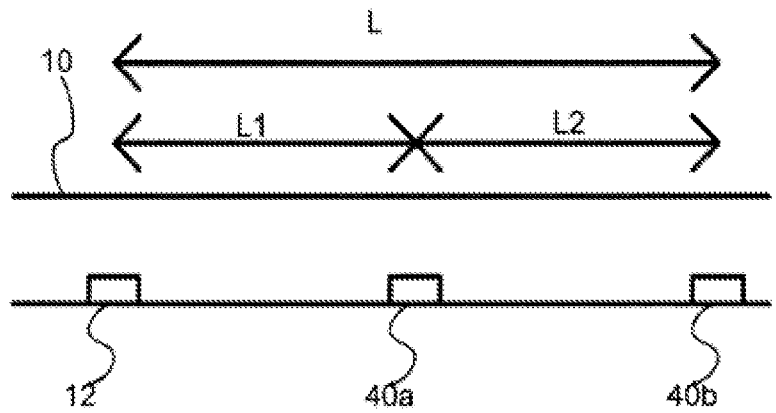

- the control circuit causes application of a pulsed displacement exiting signal — 31
- the control circuit records signals received by receivers during a predetermined time interval that extends over expected times of reception of the signal from the transducer at the receivers — 42
- the control circuit computes cross-correlation values between the recorded signals from the receivers for a plurality of different time shifts of these signals relative to each other — 43
- the control circuit determines a time shift value for which the computed cross-correlation has its largest value, optionally of an interpolation of the cross-correlation value for discrete time shift values for which the cross-correlation value has been calculated — 44
- the control circuit uses the difference as an indication of the fluid density — 35

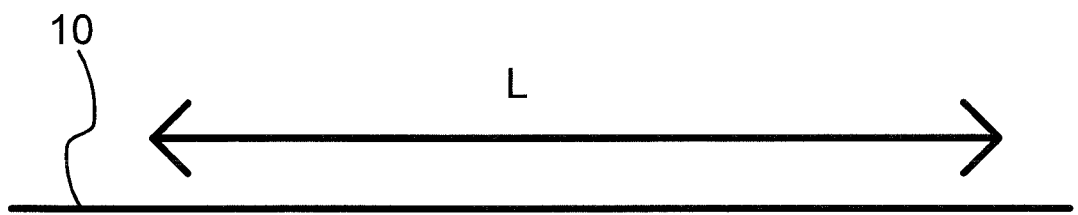
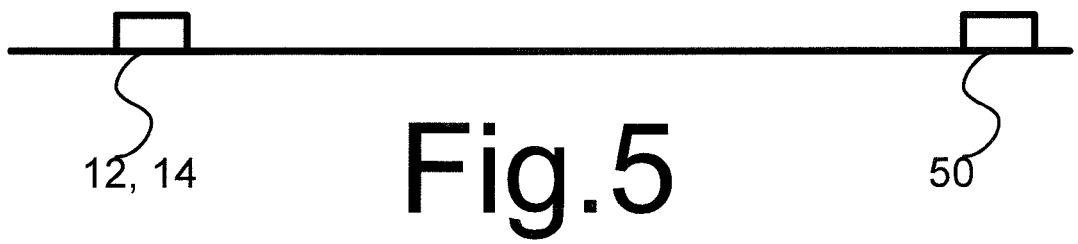
Fig.5
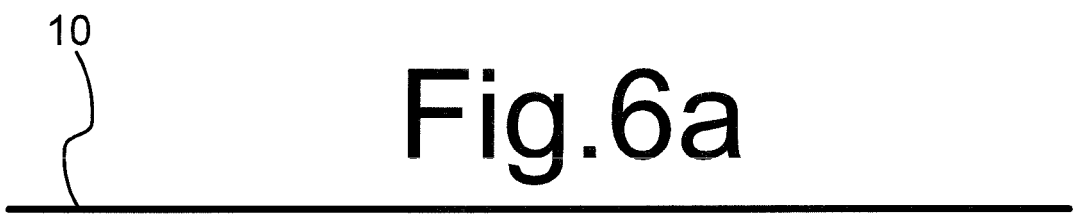
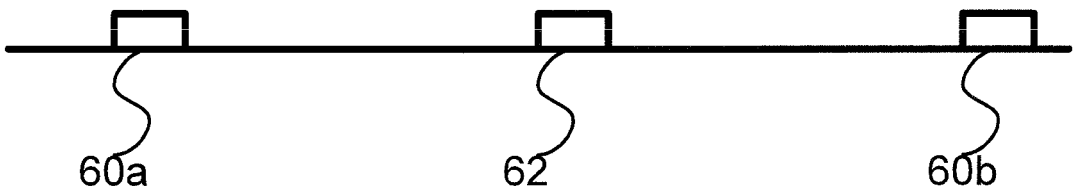
Fig.6a
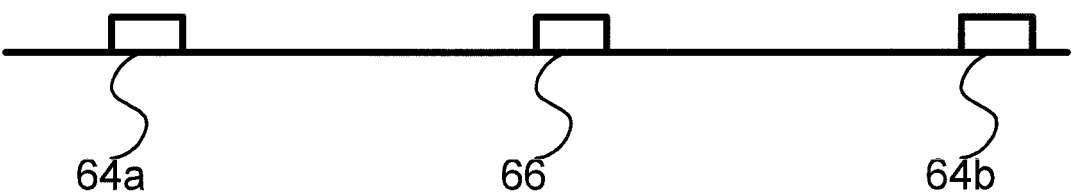
Fig.6b

TORSION WAVE BASED FLUID DENSITY MEASURING DEVICE AND METHOD

This application is the U.S. National Phase of, and Applicants claim priority from, International Patent Application Number PCT/NL2016/050797 filed 16 Nov. 2016, which claims priority from EP 15194806.4 filed 16 Nov. 2015, each of which is incorporated herein by reference.

FIELD OF THE INVENTION

The invention relates to a fluid density measuring device and method.

BACKGROUND

U.S. Pat. No. 4,193,291 discloses an fluid density measuring device that measures fluid density based on torsion wave propagation in a block of material that is immersed in the fluid.

Torsion waves involve propagation of circumferential displacement patterns along an axial direction of the block of material. In a lowest order mode the pattern simply involves the same amount of rotational displacement of all material that shares the same axial position in the block. An initial amount of rotational displacement at one axial position is transmitted axially through the block via axially neighboring positions. This results in an amount of rotational displacement that is a function of axial position and time. When a temporally periodic amount of rotation is used, this results in a wave with a definite propagation speed.

The device of U.S. Pat. No. 4,193,291 is based on the fact that the fluid has to be moved together with the circumference of the block when the cross-section of the block is non-circular, for example rectangular. The need to move the fluid affects the wave speed in a way that depends on the density of the fluid. This makes in possible to determine the fluid density from torsion wave measurements.

U.S. Pat. No. 4,193,291 uses a transducer assembly connected to the block to impart rotation to an axial end of the block and a sensor at the other axial end of the block to detect the arrival of waves excited by that rotation.

The insertion of a block of material in a fluid container with connections for the excitation and reception of torsional waves may create problems when the density has to be measured in hostile environments. Oil wells are an example of such hostile environments. Density measurement in oil well pipes may be used to estimate the amount of water that comes up mixed with oil. Currently such measurements are performed using radioactive sources, which require significant safety precautions.

U.S. Pat. No. 6,412,354 discloses a fluid property monitor that uses multiple frequency inputs in vibrational modes of a circular fluid conduit to produce resonant frequency outputs from which fluid density, compressibility and viscosity is determined. The vibrational modes include a flexural mode, a radial mode and a torsional mode.

US2011167906 discloses a torsional sensor for sensing fluid density. The sensor includes a torsional portion with a plurality of projections extending outward and spaced apart from each other. The torsional portion is mounted immersed in the fluid, so that propagation of torsional waves is affected dependent on the density.

US2003230150 discloses a transducer for measuring properties of a flowing fluid in a flow tube. Deformation of the flow tube due to reaction forces is measured. A swirl is generated in the entering fluid at the inlet of the tube by a propeller or other helical component at the input of the tube. The swirl results in rotational fluid motion and centrifugal forces that result in a reproducible density distribution.

US2013146388 discloses acoustic waveguides for mounting to a conduit. The acoustic waveguides are used to measure the characteristics of a traveling fluid in a conduit. The acoustic waveguide are designed to provide a mounting area that minimizes the effect of the mount on the acoustic wave.

SUMMARY

Among others, it is an object to provide for a more robust way of measuring density using torsion wave propagation.

According to one aspect a fluid density measuring device is provided. By using a pipe wall wherein the inner surface that surrounds the fluid has a non-circular cross-section, the effect of the fluid on torsion wave propagation can be measured in a more robust way. In an embodiment the pipe wall has an inner wall surface that has the same non-circular cross-section for all axial positions over a continuous range of axial positions, e.g. in at least the axial segment between the transducer and the receiver.

A transducer is provided to excite the torsion wave and a receiver is provided to receive the torsion wave after propagation through the pipe-wall. The transducer and receiver may be a sound transducer and a sound receiver, preferably designed to transduce and receive ultrasound. A transceiver or transceivers that are capable of operating both as a transducer to excite torsion waves and to receive torsion waves may be used both as transducer and receiver. The claimed transducer and receiver need not be separate devices. When a reflector is used that reflects the torsion wave, the excitation and reception may be performed by a same transceiver that forms both the transducer and the receiver. Alternatively, the transducer and the receiver may be separate devices at different axial locations between which the torsion wave propagates directly.

The device may comprise a control circuit coupled to the receiver and the transducer, configured to cause the transducer to excite a torsion wave in the pipe wall, to receive a response to the arrival of the torsion wave from the receiver and to determine the wave propagation delay of the torsion wave through the pipe using the response by the receiver. In a further embodiment the control circuit may be configured to determine wave propagation delays of the torsion waves travelling in opposite axial directions through the pipe wall and to determine an indication of average torsion wave speed from the propagation delays of the torsion waves travelling in the opposite axial directions. In this way, the effect of fluid flow on the measurement may be reduced.

In an embodiment, the inner wall surface comprises a protrusion that has a convex cross-section part in the cross-section and extends in the axial direction along said at least part of the pipe. For example, the protrusion may have the form of a fin that projects radially inward from a circular part of the inner wall surface. Alternatively, a concave polygonal inner cross section may be used (e.g. a square or an equilateral triangle). However, it has been found that a protrusion like a fin that has a convex cross-section part provides for higher sensitivity to fluid density.

The sensitivity may be increased by using an inner wall surface comprising a plurality of protrusions, preferably successively at equal circumferential distances, e.g. in the form of a plurality of radially inward fins. For example, 8-32 regularly spaced fins may be used.

In an embodiment, the fluid density measuring device has an outer wall surface that has a substantially circular cross-section in the part of the pipe where the inner wall is non-circular. This minimizes the effects of the fluid outside the pipe on the propagation of the torsion wave. In an embodiment, e.g. in an oil well, the pipe may be include in the inner space of an outer pipe for reasons of robustness or other reasons and fluid may be present between the outer pipe and the pipe wherein the torsion wave propagate. A circular outer cross-section of the latter reduced the effect of such fluid on the torsion wave. Even if the circular outer wall cross-section is not perfectly circular, it may be substantially circular in the sense that its deviations from circularity are much smaller in amplitude than those of the inner wall cross-section (e.g. less than 10%) and/or that any outer wall deviations do not extend axially over the entire torsion wave propagation distance.

In an embodiment, the transducer is located on the inner wall surface, located between a circumferentially successive pair of the protrusions (e.g. between fins). Locating transducers on a pipe adds stress, for example because a local deviation from a circular cross-section has to be introduced. Compared to locating the transducers on the outside of the pipe, locating the transducers between the protrusions results in lower stress on the pipe material. This makes it possible to use a thinner pipe, which in turn increases the sensitivity of torsion wave propagation on fluid density. Similarly, the receiver is preferably located on the inner wall surface between protrusions.

In an embodiment, sound transducers such as ultrasound transducers are located on the inner wall surface between each circumferentially successive pair of the protrusions. This makes it possible to concentrate torsion wave excitation in a selected wave mode, such as a lowest order mode with uniform circumferential displacement as a function of circumferential position, by coordinating the excitation phase of the transducers. However, it should be noted that selected mode excitation may also be possible when there are ultrasound transducers only between part of the pairs. More selective mode excitation can be realized without exceeding limitations on stress when the transducers and/or receivers are located on the inside of the pipe than when they are located on the outside of the pipe.

In an embodiment, the pipe wall has the same non-circular cross-section at least in an axial segment of the pipe that includes an axial location of the transducer and an axial location of the receiver. Thus, a minimum of disturbance of torsion wave propagation occurs between the transducer and the receiver. In a further embodiment, a further ultrasound receiver is provided located on the pipe wall at an axial location between the axial locations of the transducer and the receiver, and a control circuit configured to measure a delay between arrival of torsion waves from the transducer by the receiver and the further receiver. This makes it possible to reduce the effect of excitation timing on measurement of propagation delay.

In an embodiment, an ultrasound reflector is provided, in or on the pipe wall, configured to reflect at least torsion waves travelling through the pipe wall. The reflector may be realized by a change of cross-section of the pipe wall, e.g. from non-circular to circular, or by a step in pipe wall thickness, an object attached to the pipe wall etc. In this embodiment, torsion wave travel time back and forth to the reflector may be measured. Preferably, the pipe wall has the same non-circular cross-section at least in an axial segment of the pipe that includes an axial location of the reflector and the axial location or axial locations of the receiver and the transducer. Thus, a minimum of disturbance of torsion wave propagation occurs between the receiver and the reflector. When the receiver is located between the transducer and the reflector, a control circuit may be used to measure the delay between the passage of the torsion wave at the receiver with and without reflection. In a further embodiment a transceiver forms both said transducer and the receiver. Thus, the transceiver may be used to determine the travel time of a wave excited by itself and reflected by the reflector. In a further embodiment, a further ultrasound reflector located in or on the pipe wall, the axial location of the receiver being located at the further reflector or between the further reflector and the reflector. Thus, different orders of reflection may be used to determine propagation.

In an embodiment, the pipe wall in a further part of the pipe wherein the inner wall surface has a substantially circular cross-section, the fluid density measuring device comprising a control circuit configured to measure traveling speed of torsion waves in both the part of the pipe wherein the inner wall surface has a non-circular cross-section and the part of the pipe wherein the inner wall surface has a substantially circular cross-section. This makes it possible to measure and compensate for effects other than fluid density that may affect propagation speed (such as the viscosity of the liquid).

In an embodiment, the fluid density measuring device is used in an oil well to monitor a fluid density of a mixture of oil and water flowing through the pipe. In other embodiments, it may be used above ground, e.g. near the mouth of an oil well.

BRIEF DESCRIPTION OF THE DRAWING

These and other objects and advantageous aspects will become apparent from a description of exemplary embodiments with reference to the following figures.

FIG. 3 shows an embodiment of part of a fluid density measuring system.

FIG. 3a shows a flow chart of density measurement.

FIG. 4 shows an embodiment of part of a fluid density measuring system.

FIG. 4a shows a flow chart of density measurement.

FIG. 5 shows an embodiment of part of a fluid density measuring system.

FIGS. 6a,b show use of shared transceivers.

DETAILED DESCRIPTION OF EXEMPLARY EMBODIMENTS

Figure 1:
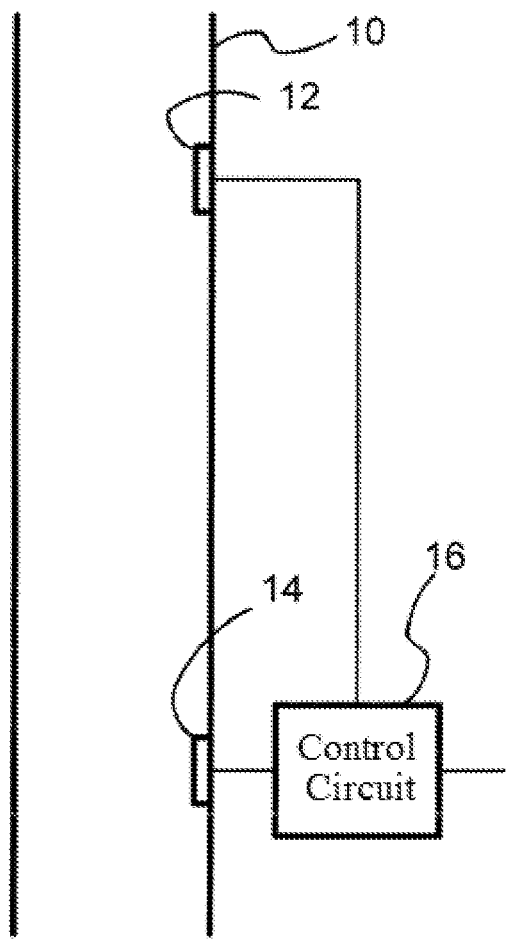
FIG. 1 schematically shows a fluid density measuring system.

FIG. 1 schematically shows a fluid density measuring system, comprising a pipe 10, a transducer 12 and a receiver 14 attached to pipe 10, and a control circuit 16 coupled to transducer 12 and receiver 14. Control circuit 16 may comprise a programmable computer, programmed with a program with instructions to cause transducer 12 to excite local torsion in pipe 10 and to receive wave measurements from receiver 14.

Pipe 10 may be located in an oil well, where its main function is to transport well fluid, e.g. a mixture of oil and water, and the fluid density measuring system measures the density of well fluid flowing through in pipe 10. Pipe 10 comprises a pipe wall that circumferentially surrounds a space for containing the fluid. The space may be open at the axial ends of pipe 10 to enable fluid flow. Pipe 10 is cylindrical and has a non-circular inner cross-section. That is, the pipe wall has an inner surface and the cross-section of the inner surface with a virtual plane perpendicular to the axial direction of pipe 10 is non-circular. Obviously no manufactured pipe will have a perfectly circular inner cross-section. But the inner pipe is intentionally non-circular, i, e, it deviates more from a circular cross-section than due to normal manufacturing tolerance, The cross-section may be the same for all axial positions over a continuous range of axial positions.

Figure 2A:
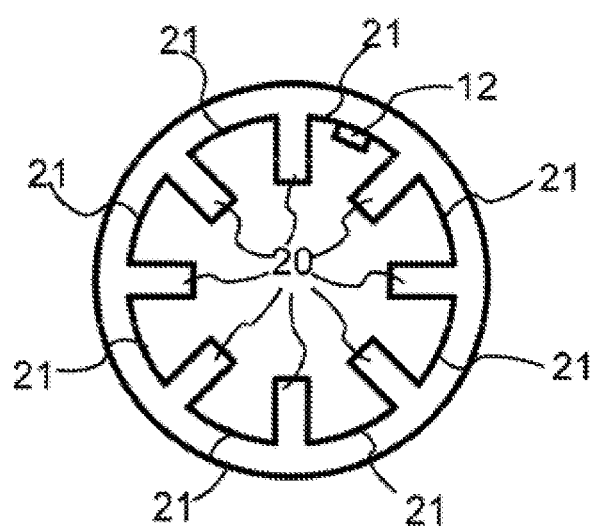
FIGS. 2a-d show examples of cross sections of a pipe in a fluid density measuring system.
Figure 2B:
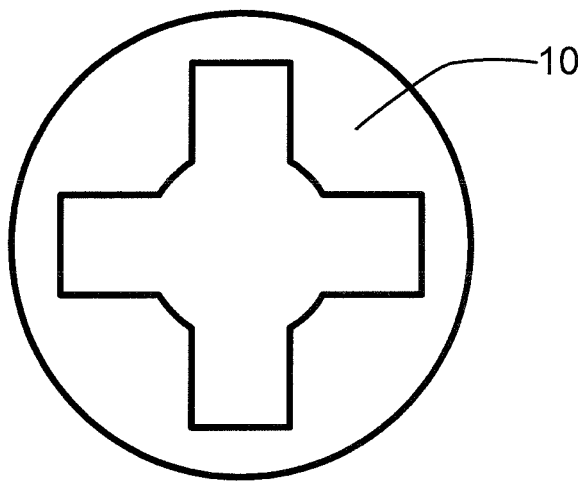
Figure 2C:
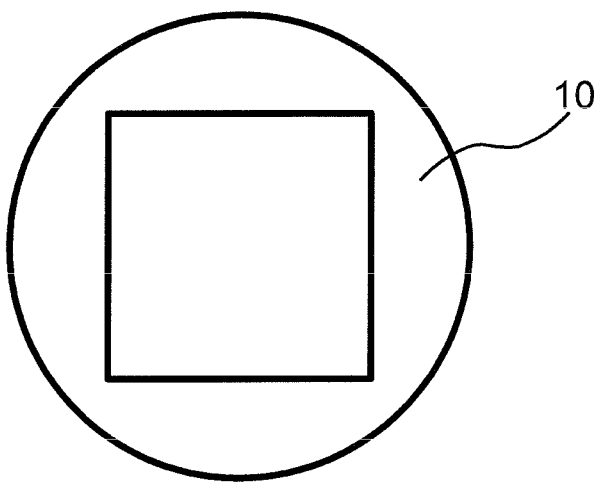

FIGS. 2a-c show examples of possible cross sections. Preferably, the selected cross section stays the same over length of the pipe in the axial direction, but alternatively it may vary. In FIG. 2a, the inner wall forms a plurality of radially and axially extending fins that protrude radially inward into the inner space of the pipe. In the cross section, first parts of the inner surface lie along parts of a circular ground shape and these first parts 21 are connected by second parts 20 that protrude radially inward from the circular ground shape. In an embodiment, all second parts extend inward by the same amount, so that the inward most tips of the pipe wall in the second parts lie on an inward circle with a smaller radius than the circular ground shape. In a further embodiment all second parts may have the same shape. The number of second parts in the figure is an arbitrary example. A pipe with sixteen fins may be used for example. In an embodiment, the outer pipe radius is 70 millimeters, the inward circle radius is 38 millimeters, the protruding parts protrude 17 millimeters in the radial direction and are 6 millimeters wide at their base.

In FIG. 2b, the inner wall forms a plurality of radially and axially extending grooves that protrude radially outward. In the cross section, first parts of the inner surface lie along parts of a circular ground shape and these first parts are connected by second parts that extend radially outward from the circular ground shape. Thus, in this embodiment, the first parts form the top of protrusions that extend radially inwards from the largest radial extent of the inner space of pipe 10. In an embodiment, all second parts extend outward by the same amount. In a further embodiment all second parts may have the same shape. In the illustrated embodiment there are four such grooves, with rectangular bottoms.

As may be noted, the embodiments of both FIGS. 2a, b effectively show grooves that extend radially outward from an inner circle on which the innermost parts of the inner surface of the pipe wall are located. In other words, the embodiments result in radially inward protrusions from the largest radial extent of the inner space of pipe 10, wherein the protrusions have a convex shape, i.e. where there lines can be drawn between points on the inner surface of the pipe wall that run entirely through the pipe wall rather than through the inner space. The presence of such convex shapes means that fluid on both sides of the convex shape must be displaced in a circumferential direction. Circumferential displacement of the pipe wall requires that at least the fluid in these grooves must be displaced circumferentially. Hence such grooves increase the effect of the fluid on torsion wave propagation. Due to viscosity an amount of fluid of fluid within the inner circle must be displaced circumferentially as well. This increases the effect on torsion wave propagation.

In FIG. 2c, the inner wall has a rectangular cross-section (e.g. square) this also results in an association of the circumferential displacement of the pipe wall with the displacement of the fluid. Similarly, other polygonal cross sections may be used, e.g. triangular or hexagonal. It may be noted that these do not result in protrusions with a convex shape. It has been found that the embodiments with protrusions of convex shape on the inner wall surface produce a larger effect of the fluid on torsion wave measurement.

Another issue with the pipe cross-section involves stress in the pipe wall. In high pressure environments, such as oil wells, attention is needed to avoid failure of the pipe due to excessive peak stresses. This imposes a minimum thickness on the pipe wall. Use of polygonal cross-sections increases the minimum required pipe wall thickness needed to avoid failure, which in turn reduces torsion wave dependence on fluid properties. The required thickness can be reduced by using increased rounding. But in the polygonal cross-sections rounding also reduces the amount of fluid displacement in the circumferential direction. Either way, sensitivity is reduced. The use of protrusions with convex shape makes it possible to realize higher sensitivity with a smaller pipe wall thickness at the locations where the pipe wall thickness is at minimum and hence to more sensitivity.

Transducer 12 and receiver 14 are designed to excite a time dependent local torsion in pipe 10, for example with a frequency of 40 kHz, i.e. in the ultrasound frequency range of 20 kHz upward. Ultrasound transducers and receivers may be used as transducer 12 and receiver 14. However, for large pipe diameters lower frequencies may be used. Although the frequency is not critical, the optimum frequency is roughly proportional to the inner pipe diameter (of the free part not containing protrusions), e.g. 300 kHz for an inner pipe diameter of 1 cm, but any frequency in a range of 75-525 kHz may work for such a diameter. Ultrasound may be used for pipes with inner diameters of less than about 25 cm. For a pipe with an inner diameter of one meter, any frequency in a range of 750 Hz-5 Khz may work.

Figure 2D:
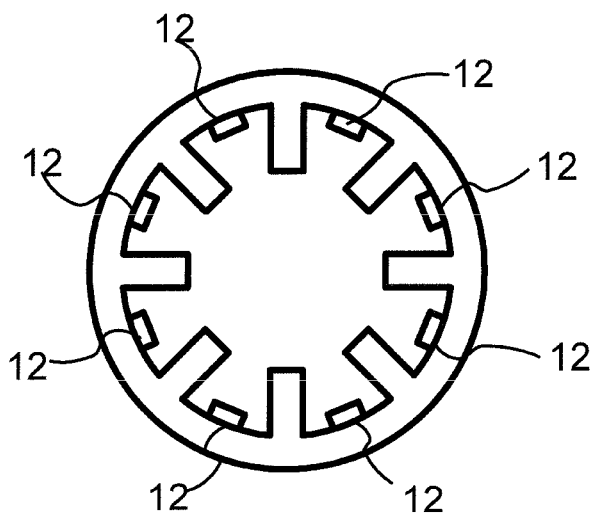

FIGS. 2a, d illustrate an embodiment of the location of transducers 12. By way of example, FIG. 2a shows an embodiment where a single transducer 12 is shown. FIG. 2d shows a preferred embodiment with a plurality of transducers. But a single or a few transducers may suffice. A transducer 12 may be located at the bottom of a groove formed between the fins, attached to the inner surface of the pipe wall. As is known per se, transducers act by causing relative displacement of mass, which, because the transducers as attached to the wall surface, involves local movement of the pipe wall relative to a remainder of the pipe wall. A piezo transducer or an electromagnetic acoustic transducer (EMAT) may be used for example. For example, piezo transducers of 11 millimeter circumferential length, 30 millimeter axial length and 5 millimeter radial thickness may be used. In the fluid density measuring device, transducer 12 is directed so that it displaces mass in a circumferential direction. A temporally periodic displacement may be used that oscillates as a function of time, when transducer 12 is caused to do so by control circuit 16.

Preferably, transducers 12 are located in a plurality of grooves, located at the bottom of the grooves at corresponding axial positions. In this embodiment, transducers 12 are preferably caused to oscillate in phase, so that all transducers 12 always locally move the pipe wall in the same circumferential direction at the same time. In this way, wave excitation is concentrated in a lowest order mode that provides for the most straightforward relation between torsion wave propagation speed and fluid density. However, higher order torsion wave modes may be used instead. Transducers 12 located at different axial positions and/or excitation with non-zero phase offset may be used. This may be used to excite higher order modes or the lowest order mode. For example, transducers in different grooves at different axial positions may be excited with phase offsets corresponding to the propagation speed of the lowest order mode. Preferably, transducers 12 are located in all grooves. This may be used to optimize the concentration of wave excitation in the lowest order mode.

A measuring system with transducers 12 on the inside of the pipe wall may involve electrical wiring (not shown) passing to the control circuit through the pipe wall. This may reduce robustness of the pipe against stress when under high pressure. As an alternative, transducers 12 may be located on the outward surface of the pipe wall. This avoids increase of stress due to wiring through the pipe wall. It has been found that in the design with convex protrusions with a transducer or transducers in the grooves formed between the protrusions a higher measurement sensitivity can be achieved without excessive peak stresses.

Preferably, the outward surface of the pipe wall has a circular cross-section, as shown in FIGS. 2*a-c*. In this way, the relative effect of the density of the fluid located on the outside on the torsional wave propagation in the pipe is minimized. The pipe may in turn be surrounded by a casing and optionally further fluid between the pipe and the casing. Use of a circular outer cross-section reduces the effect of the casing and/or further fluid on torsion wave propagation.

FIG. 3 shows an embodiment wherein a receiver 14 is located in pipe 10 at a different axial position than transducer 12, separated by a pipe section with axial length L. Pipe 10 has a non-circular inner surface cross section (e.g. as shown in FIGS. 2*a-c*) in the section of pipe 10 along the length L.

In an embodiment, transducer 12 and receiver 14 are both transceivers that may be used both for exciting and receiving. In this embodiment, the control circuit may be configured to measure wave propagation delay in opposite axial directions along the pipe section of length L. The control circuit may be configured to compute an average wave speed, or more generally a sum of these delays to measure the fluid density. In this way, effects of fluid flow in pipe 10 on the measurement may be reduced.

FIG. 3*a* shows a flow chart of operation of the control circuit in this embodiment. The control circuit may comprise a stored computer program to control execution of the steps of the flow-chart. In a first step 31, the control circuit causes application of a pulsed displacement exiting signal to transducer 12 or a plurality of transducers at the same axial positions. In an embodiment, a control signal may be used that cause a plurality of oscillations of the displacement at a predetermined oscillation frequency (e.g. 40 kHz) during a pulse time interval. In a second step 32, the control circuit records a time count at the time of transmission, or resets a time count. In a third step 33, the control circuit monitors wave reception amplitude at receiver 14, and detect when a peak reception amplitude occurs, optionally from a filtered signal component at the oscillation frequency. In a fourth step 34, the control circuit determines the difference between the time count at the time at which the peak wave reception amplitude occurred and the time count at the time of transmission. In a fifth step 35, the control circuit uses the difference e.g. by computing an estimated density, or by controlling further equipment (not shown) dependent on the difference.

Preferably, pipe 10 has the same non-circular inner surface cross section along the entire length of the section of length L. However, it may suffice that pipe 10 has such a cross section only along part of the section of length L. Having the same non-circular cross section along the entire section of length L has the advantage that the effect of the fluid on propagation is maximized and confusing reflections are reduced. Parts of the pipe outside this section need not have such a cross-section: they may have a circular inner surface cross-section. Instead of a single receiver 14, a plurality of receivers may be used at the same axial position. The same goes for transducer 12.

FIG. 4 shows an embodiment wherein a first and second receiver 40*a,b* are located in pipe 10. Second receiver 40*b* is separated from transducer 12 by a pipe section with axial length L. First receiver 40*a* is located axially between transducer 12 and second receiver 40*b*, separated by first and second pipe sections of length L1 and L2 respectively (L=L1+L2). Pipe 10 has a non-circular inner surface cross section (e.g. as shown in FIGS. 2*a-c*) at least in the second pipe section of L2 between the axial positions of first and second receiver 40*a, b* and preferably over the entire length L. The control circuit may be configured to compute a difference between the times of arrival of torsional waves at first and second receiver 40*a, b* due to travel over the length L2, after excitation by transducer 12 and propagation over the length L1. This may be used to eliminate the effect of excitation timing on the delay between excitation and reception.

FIG. 4*a* shows a flow chart of operation of the control circuit in this embodiment. Similar steps as in FIG. 3*a* have been labeled with the same number. In a first step 31, the control circuit causes application of a pulsed displacement exiting signal. In a second step 42, the control circuit records signals received by receivers 40*a, b* during a predetermined time interval or time intervals that extend over expected times of reception of the signal from transducer 12 at receivers 40*a, b*. In a third step 43, the control circuit computes cross-correlation values between the recorded signals from receivers 40*a, b* for a plurality of different time shifts of these signals relative to each other. In a fourth step 44, the control circuit determines a time shift value for which the computed cross-correlation has its largest value, optionally of an interpolation of the cross-correlation value for discrete time shift values for which the cross-correlation value has been calculated. In a fifth step 35, the control circuit uses the difference as an indication of the fluid density.

In an embodiment, transducer 12 and at least second receiver 40*b* are both transceivers that may be used both for exciting and receiving. In this embodiment, the control circuit may be configured to measure wave propagation delay in opposite axial directions along the pipe sections between first and second receiver 40*a,b* and between first receiver 40*a* and transducer 12 acting as receiver. The control circuit may be configured to compute an average wave speed of these measurements or more generally a sum of the delays (weighed if L1 and L2 are not equal). In this way, effects of fluid flow in pipe 10 on the measurement may be reduced.

FIG. 5 shows an embodiment for using wave reflection. In this embodiment receiver 14 and transducer 12 may be located at the same or nearby axial positions, or transducer 12 may act both as receiver and transducer. An ultrasound reflector 50 is located at a different axial position than transducer 12, separated by a pipe section with axial length L. Pipe 10 has a non-circular inner surface cross section (e.g. as shown in FIGS. 2*a-c*) in the section of pipe 10 along the length L. Reflector 50 may be a transition between non-circular inner surface cross section and circular inner surface cross section of pipe 10, or any other structure that changes the wave impedance or geometry as a function of axial position, such as a weld joint between pipe sections. Use of reflection measurement has the advantage that directional effects on the measurement due to flow are reduced.

In an embodiment, transducer/receiver 12 may be located at the axial location of a further reflector, or between the further reflector and reflector 50. The further reflector may be realized in any of the ways described for reflector 50. In this embodiment, transducer/receiver 12 will receive multiple reflections of torsion waves traveling back and forth between the reflector and the further reflections. When pulse transmission is used, these lead to reception of successive reflection pulses at receiver 14, which may be numbered in order of reception. The control circuit may be configured to measure the effect of the fluid on the delay between transmission and reception of the nth reflection (n>1). In this way, the change of delay due to the fluid can be increased. In an embodiment, the control circuit is configured to measure the effect of the fluid on the delay between reception of the nth reflection and the mth reflection (m>n>1). In this way, time delay/phase effects due to the electronics, the transmitter/receiver/transceiver can be eliminated from the measurement. When m=n+k with k>1, a plurality of k wave travel delays back and forth may be used to increase sensitivity.

An operation of the control circuit like that of FIG. 4a may be used, with cross-correlation of the nth and mth received reflection signal instead of cross-correlation of the signals from first and second receiver 40a,b. Instead, the deconvolution of a product of the signal at the mth reflection by the signal at the nth reflection may be used.

Instead of cross-correlation, deconvolution may be used. Deconvolution may be realized for example by computing the Fourier transforms of the recorded signals of the nth and mth reflection from receiver 14, computing and ratios of the Fourier transform of the recorded signal of the mth reflection divided by the Fourier transform of the recorded signal from the nth reflection at corresponding frequencies. The ratios correspond to a deconvoluted signal in the Fourier transform domain. Optionally, an inverse Fourier transform of the frequency dependent signal formed by the ratios may be computed to obtain the deconvoluted signal in the time domain.

Deconvolution eliminates, or at least reduces the effect of the transfer functions of the electronics, the transmitter and receiver/transceiver and the phase response of the voltage excitation. Because the reflection coefficients of the reflector usually have zero phase, the effect of the reflection on the phase is also removed. The wave speed may be determined from the phase Phi of the deconvoluted signal at the oscillation frequency f, according to the relation c=L2*f/Phi, where c is the wave speed.

Deconvolution may also be used in the other embodiments. Assuming that the first and second receivers 40a,b of the embodiment of FIG. 4 have the same response functions, use of deconvolution of their signals instead of cross-correlation may be used to eliminates the effect of transmission to the first receiver 40a and the receiver response functions from the measurement. The same holds when the function of first and second receivers 40a,b is performed by a single receiver in combination with a reflector. Deconvolution may make a separate summing step for summing delays unnecessary.

The control circuit may be configured to translate measured delays into density measurements using calibration data. In one embodiment, control circuit may be configured to use a memory and a look-up table stored in the memory to look up density values corresponding to delays. Optionally, interpolation may be used between densities corresponding to delays for which calibrated values are available. The look up values for a specific pipe design may be determined by means calibration measurements using fluids of known density.

In an embodiment wherein the fluid is a mixture of two known fluids, such as a mixture of water and oil, the measured delays may be translated into a quantitative measure of the density ratio of the fluids. A water cut ratio R may be determined, which corresponds to R=(d−d1)/(d2−d1), wherein d1 is the density of water and d2 is the density of oil, when an additional data is available, e.g. a measurement of the fluid flow speed or knowledge of the density of one of the components. By means of calibration data, R may be determined directly from the delay.

When the measurements are used to generate a signal, e.g. a signal to control fluid flow shut off, a signal to control fluid flow redirection or an alarm signal, translation may not be not needed. A threshold value may be set and the control circuit may be configured to generate the signal when it measures a delay that exceeds the threshold value. Similarly, calibration may not be needed when the measurements are used in a feedback loop that is configured to regulate fluid density to a set value. In this case, a delay value may be used as a set value instead and the feedback loop may be configured to regulate fluid density in a direction wherein the difference between the measured delay and the set value is reduced.

In addition to torsion wave speed in a pipe with a non-circular inner wall surface, wave speed in a pipe with a circular inner wall surface may be measured in the presence of the same fluid. The latter may be used to correct for effects of temperature and viscosity variations if they occur, e.g. by subtracting wave speed measured with a circular inner wall surface, from wave speed measured with a non-circular inner wall surface. Such wave speeds may be measured in different sections of a pipe, that have a circular and non-circular inner wall surface cross-section. Alternatively, the wave speeds may be converted into a density (from measurements using the pipe section with the noncircular cross-section) and a viscosity value (from measurements using the pipe section with circular cross-section). When the viscosity is variable, its measurement can then be used to determine a correction of the density, using a calibration of the dependence of the correction of the torsion wave speed on viscosity or a model of this dependence (e.g. an analytical model, which is known per se).

FIGS. 6a,b show shared transceivers for performing such measurements. In the embodiment of FIG. 6a, the pipe comprises first and second reflector 60a,b and a transceiver 62 or transceivers in different grooves between first and second reflector 60a,b, at distances L1 and L2 from the first and second reflector 60a,b, wherein L1 and L2 may differ from each other. Reflector 60a,b may be realized as described in the preceding. The part of the pipe between first reflector 60a and transceiver 62 has a circular inner wall surface cross-section. The part of the pipe between transceiver 62 and second reflector 60b has a non-circular inner wall surface cross-section such as in FIGS. 2a-c. In this embodiment, transceiver 62 may be used to measure torsional wave propagation speeds of waves that have been reflected from first and second reflector 60a,b respectively.

In the embodiment of FIG. 6b, the pipe comprises first and second transducers 64a,b and a receiver 66 or receivers axially between first and second transducers 64a,b. The part of the pipe between first transducer 64a and receiver 66 has a circular inner wall surface cross-section. The part of the pipe between receiver 66 and second transducer 64b has a non-circular inner wall surface cross-section, such as in FIGS. 2a-c. In this embodiment, receiver 66 may be used to receive torsional waves from first and second transducers 64a,b respectively. Instead, receivers may be provided at the location of first and second transducers 64a,b and transducers may be provided at the location of receiver 66.

A fluid density measuring device uses a pipe with a pipe wall that has an inner wall surface with a non-circular cross-section at least in an axial segment of the pipe. Preferably, the inner wall surface comprises one or more protrusions extending inward into the pipe and along the axial direction of the pipe. A transducer such as an ultrasound transducer located on the pipe wall is used to generate local motion of the pipe wall with a circumferential direction of motion. Preferably, the transducer is located between successive protrusions. A receiver, such as an ultrasound receiver, located on the pipe wall receives an ultrasound torsion wave generated by said local motion after the torsion wave has traveled through the axial section wherein the inner wall surface has a non-circular cross-section. The fluid density is determined from the propagation speed of the torsion wave.

The invention claimed is:

1. A fluid density measuring device, comprising:
   a pipe, comprising a pipe wall that circumferentially surrounds an inner space for fluid in the pipe, the pipe wall in at least an axial segment of the pipe having an inner wall surface that has a non-circular cross-section with a virtual plane perpendicular to the axial direction of the pipe;
   an ultrasound transducer located on the pipe wall, directed to generate local motion of the pipe wall in a circumferential direction; and
   an ultrasound receiver located on the pipe wall, configured to receive an ultrasound torsion wave generated by said local motion after propagation through said axial segment.

2. The fluid density measuring device according to claim 1, wherein the inner wall surface comprises a protrusion that has a convex cross-section part in the cross-section with the virtual plane and extends in the axial direction along said axial segment of the pipe.

3. The fluid density measuring device according to claim 2, wherein the inner wall surface comprises a plurality of protrusions at successive circumferential positions, separated by inter-protrusion parts of said space, the inter-protrusion parts of said space being open to a central part of said space.

4. The fluid density measuring device according to claim 3, wherein the protrusions are a plurality of evenly spaced fins extending axially and radially inward from outermost parts of the inner wall surface.

5. The fluid density measuring device according to claim 3, wherein the ultrasound transducer is located on the inner wall surface, located between a circumferentially successive pair of the protrusions.

6. The fluid density measuring device according to claim 5, comprising ultrasound transducers located on the inner wall surface between each circumferentially successive pair of the protrusions.

7. The fluid density measuring device according to claim 1, wherein the pipe wall has an outer wall surface that has a substantially circular cross-section with said virtual plane along said axial segment of the pipe.

8. The fluid density measuring device according to claim 1, wherein said axial segment includes an axial location of the ultrasound transducer and an axial location of the ultrasound receiver.

9. The fluid density measuring device according to claim 8, comprising a further ultrasound receiver located on the pipe wall at an axial location between the axial locations of the ultrasound transducer and the ultrasound receiver, and a control circuit configured to measure a delay between reception of the torsion wave from the ultrasound transducer by the ultrasound receiver and the further ultrasound receiver.

10. The fluid density measuring device according to claim 1, comprising an ultrasound reflector, in or on the pipe wall, configured to reflect at least the ultrasound torsion wave travelling through the pipe wall, wherein the axial segment includes an axial location of the ultrasound reflector and the axial location or axial locations of the ultrasound receiver and the ultrasound transducer.

11. The fluid density measuring device according to claim 10, comprising an ultrasound transceiver that forms both the ultrasound transducer and the ultrasound receiver.

12. The fluid density measuring device according to claim 10, comprising a further ultrasound reflector, located in or on the pipe wall, the axial location of the ultrasound receiver being located at the further ultrasound reflector or between the further ultrasound reflector and the ultrasound reflector.

13. The fluid density measuring device according to claim 12, comprising a control circuit configured to measure a delay between arrival of respective different reflections of the ultrasound torsion wave from the ultrasound reflector.

14. The fluid density measuring device according to claim 1, wherein the pipe wall in a further part of the pipe wherein the inner wall surface has a substantially circular cross-section, the fluid density measuring device comprising a control circuit configured to measure traveling speed of the ultrasound torsion wave in both the part of the pipe wherein the inner wall surface has a non-circular cross-section and the part of the pipe wherein the inner wall surface has a substantially circular cross-section.

15. The fluid density measuring device according to claim 1, comprising a control circuit coupled to the ultrasound receiver and the ultrasound transducer, configured to cause the ultrasound transducer to excite the ultrasound torsion wave in the pipe wall, to receive a response to arrival of the ultrasound torsion wave from the ultrasound receiver and to determine wave propagation delay of the ultrasound torsion wave through the pipe using the response by the ultrasound receiver.

16. The fluid density measuring device according to claim 15, wherein the control circuit is configured to determine wave propagation delays of ultrasound torsion waves travelling in opposite axial directions through the pipe wall and to determine an indication of average ultrasound torsion wave speed from the propagation delays of the ultrasound torsion waves travelling in the opposite axial directions.

17. A method of measuring fluid density of fluid within a pipe, comprising:
   generating local circumferential motion of a pipe wall of the pipe by applying vibrations with an ultrasound transducer located on the pipe wall;
   receiving an ultrasound torsion wave generated by said local motion after the ultrasound torsion wave has traveled through an axial segment of the pipe, wherein an inner wall surface of the pipe has a non-circular cross-section with a virtual plane perpendicular to the axial direction of the pipe, the ultrasound torsion wave being received by means of an ultrasound receiver located on the pipe wall, the inner wall surface comprising one or more protrusions extending inward into the pipe and along the axial direction of the pipe; and
   determining the fluid density from a measured propagation speed of the ultrasound torsion wave.

* * * * *